(12) United States Patent
Matsuki

(10) Patent No.: US 8,733,098 B2
(45) Date of Patent: May 27, 2014

(54) SHAPE MEMORY ALLOY ACTUATOR

(75) Inventor: Kaoru Matsuki, Kawasaki (JP)

(73) Assignee: Olympus Corporation, Tokyo (JP)

( * ) Notice: Subject to any disclaimer, the term of this patent is extended or adjusted under 35 U.S.C. 154(b) by 124 days.

(21) Appl. No.: 13/400,830

(22) Filed: Feb. 21, 2012

(65) Prior Publication Data

US 2012/0180474 A1 Jul. 19, 2012

Related U.S. Application Data

(63) Continuation of application No. PCT/JP2010/062535, filed on Jul. 26, 2010.

(30) Foreign Application Priority Data

Aug. 25, 2009 (JP) ................................. 2009-193844

(51) Int. Cl.
*F01B 29/10* (2006.01)
*F02G 1/04* (2006.01)
*G02B 7/02* (2006.01)
*A61B 1/00* (2006.01)

(52) U.S. Cl.
USPC ................ 60/527; 60/528; 359/822; 600/101

(58) Field of Classification Search
USPC .............................. 60/527–529; 600/101–181
See application file for complete search history.

(56) References Cited

U.S. PATENT DOCUMENTS 7,299,630 B2 * 11/2007 Browne et al. ................... 60/527
7,451,595 B2 * 11/2008 Komori et al. ................... 60/527
7,555,900 B1 * 7/2009 Vallance et al. ................. 60/528
7,788,921 B2 * 9/2010 Takahashi ......................... 60/528
2009/0013684 A1 1/2009 Takahashi

FOREIGN PATENT DOCUMENTS

| JP | 64-012077 | 1/1989 |
| JP | 5-87677 | 12/1993 |
| JP | 2009-019517 | 1/2009 |
| JP | 2009-160276 | 7/2009 |

OTHER PUBLICATIONS

International Preliminary Report on Patentability together with the Written Opinion dated Mar. 8, 2012 for International Application No. PCT/JP2010/062535 filed on Jul. 26, 2010.
English Abstract of corresponding Japanese Patent Publication No. JP 61-019980, dated Jan. 28, 1986.
International Search Report dated Oct. 12, 2010 issued in PCT/JP2010/062535.

* cited by examiner

*Primary Examiner* — Christopher Jetton
(74) *Attorney, Agent, or Firm* — Scully, Scott, Murphy & Presser, P.C.

(57) ABSTRACT

A shape memory alloy actuator includes a shape memory alloy wire portion, a non-deformable portion, a wire portion which is formed by the shape memory alloy wire portion and the non-deformable portion, and which is inserted into a tube member, a movable body which is movable in a direction in which the length of the shape memory alloy wire portion changes, an elastic member which exerts an external force in a direction in which, the shape memory alloy wire portion elongates, and a fixed member to which, one end of the tube member and one end of the shape memory alloy wire portion are fixed. One end of the non-deformable portion which forms the wire portion is connected to the movable body, and the tube member includes therein the shape memory alloy wire portion, and includes therein at least a part of the non-deformable portion.

14 Claims, 7 Drawing Sheets

SHAPE MEMORY ALLOY ACTUATOR

CROSS-REFERENCE TO RELATED APPLICATIONS

The present application is based upon and claims the benefit of priority from the prior Japanese Patent Application No. 2009-193844 filed on Aug. 25, 2009; the entire contents of which are incorporated herein by reference.

BACKGROUND OF THE INVENTION

1. Field of the Invention

The present invention relates to a shape memory alloy actuator which includes a shape memory alloy wire portion which contracts by heating by applying current and elongates by cooling, which results in a change in a length thereof.

2. Description of the Related Art

A shape memory alloy actuator which includes a shape memory alloy has hitherto been used. In the shape memory alloy, there exists a state of an austenitic phase and a martensitic phase, and the state changes to the martensitic phase when a temperature is low and to the austenitic phase when the temperature is high. Moreover, at the time of transition (reverse transformation) from the martensite to the austenite, a large distortion restoring force is generated with a small temperature difference. The shape memory alloy actuator is an actuator in which the distortion restoring force is used.

An actuator in which a change in a shape of the shape memory alloy is used has superior characteristics for small-sizing and making light-weight.

For instance, in Japanese Patent Application Publication after examination No. Hei 5-87677, a conventional shape memory alloy actuator has been disclosed. FIG. 7 is a partial cross-sectional front view of a conventional shape memory alloy actuator 101. The shape memory alloy actuator 101 has a structure in which, one end of a wire material of a shape memory alloy 12 is let to be a fixed end 12a and the other end of thereof is let to be a movable end 12b. The movable end 12b moves due to a stress by a bias spring 21 and a force of contraction which is generated when a change in a length of the wire material of the shape memory alloy 12 has changed due to a temperature change by heating by applying current to the wire material of the shape memory alloy 12. Moreover, by covering the wire material of the shape memory alloy toward the fixed end 12a, by a tube member 11 which is insulating and bendable, or flexible, a space reduction of the space memory alloy actuator 101 is also possible.

The space memory alloy actuator 101 controls an amount of distortion by the temperature change in the shape memory alloy 12 by heating by applying current. As a method of control, methods such as controlling an amount of heating by applying current by feeding back a resistance value of the shape memory alloy actuator 12, are available.

CITATION LIST

Patent Literature

Patent Literature 1: Japanese Patent Application Publication after examination No. Hei 5-87677

SUMMARY OF THE INVENTION

However, the conventional shape memory alloy actuator 101, structurally, has a portion 12c which is exposed without the shape memory alloy 12 being covered by the tube member 11. The temperature of the exposed portion 12c of the shape memory alloy 12 being susceptible to a rise in temperature, a further structural modification is necessary for improving controllability of the amount of distortion, or, for reduced consumption of electric power by suppressing to minimum the amount of heat required for deformation.

The present patent application has been made in view of the abovementioned circumstances, to provide a shape memory alloy actuator which has a structure for further improvement in the controllability.

To solve the abovementioned issues and to achieve an object, the shape memory alloy actuator according to the present invention includes a shape memory alloy wire portion of which a length changes due to contraction by heating by applying current, and due to elongation by cooling, a non-deformable portion which is formed at the other end of the shape memory alloy wire portion, and of which a length does not change, a wire portion which is formed by the shape memory alloy wire portion and the non-deformable portion, and which is inserted through a tube member, a movable body which is movable in a direction in which the length of the shape memory alloy wire portion changes, an elastic member which exerts an external force in the direction in which the shape memory alloy wire portion elongates, and a fixed member to which, one end of the tube member and one end of the shape memory alloy wire portion are fixed, and one end of the non-deformable portion which forms the wire portion is connected to the movable body, and the tube member includes therein the shape memory alloy wire portion, and includes therein at least a part of the non-deformable portion.

Moreover, according to a preferable aspect of the present invention, it is desirable that the non-deformable portion is a wire of which, one end is to be connected to the shape memory alloy wire portion, and the other end is to be fixed to the movable body.

Moreover, according to a preferable aspect of the present invention, it is desirable that the tube member has a rigid portion which is near a joint portion of the shape memory alloy wire portion and the wire.

Moreover, according to a preferable aspect of the present invention, it is desirable that the joint portion of the shape memory alloy wire portion and the wire is inserted into a pipe member having an inner diameter larger than an outer diameter of the tube member.

Moreover, according to a preferable aspect of the present invention, it is desirable that the wire also serves as a lead tracks for applying current to the shape memory alloy wire portion.

Moreover, according to a preferable aspect of the present invention, it is desirable that the lead tracks for applying current to the shape memory alloy wire portion is connected to the joint portion.

Moreover, according to a preferable aspect of the present invention, it is desirable that the wire has a structure having an insulating coating formed thereon, or, the wire is an insulating material.

Moreover, according to a preferable aspect of the present invention, it is desirable that the tube member which includes at least a part of the wire is made of a metallic material.

Moreover, according to a preferable aspect of the present invention, it is desirable that the lead tracks for applying current to the shape memory alloy wire portion is wired to the pipe member having an inner diameter larger than an outer diameter of the tube.

Moreover, according to a preferable aspect of the present invention, it is desirable that the non-deformable portion is a site, or part at which the shape memory alloy wire portion has a metallic coating.

Moreover, according to a preferable aspect of the present invention, it is desirable that the site which is coated, also serves as a lead tracks for applying current to the shape memory alloy wire portion.

The shape memory alloy actuator according to the present invention shows an effect that since the shape memory alloy wire portion is not exposed to an outside, it is possible to make uniform a change in temperature of the overall shape memory alloy wire portion, and to improve controllability of an amount of distortion. Moreover, the shape memory alloy actuator according to the present invention shows an effect that since it is possible to suppress an amount of heat required for deformation of the shape memory alloy wire portion to minimum, it is possible to reduce electric power consumption.

DETAILED DESCRIPTION OF THE INVENTION

Shape memory alloy actuators according to the exemplary embodiments of the present invention will be described below while referring to the accompanying diagrams. However, the present invention is not restricted to the embodiments described below.

First Embodiment

Figure 1:
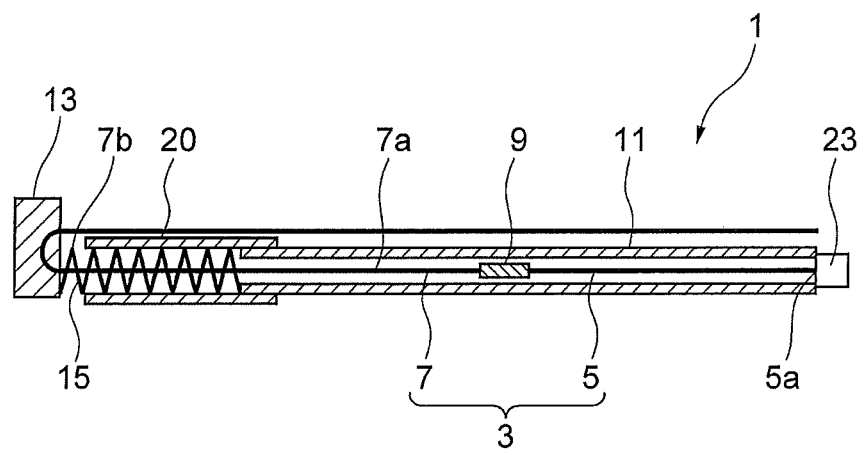
FIG. 1 is a cross-sectional view of a shape memory alloy actuator according to a first embodiment of the present invention.

FIG. 1 is a cross-sectional view of a shape memory alloy actuator 1 according to a first embodiment of the shape memory alloy actuator according to the present invention. The shape memory alloy actuator 1 includes mainly, a wire portion 3, a tube member 11, a movable body 13, a bias spring 15 which is an elastic member, and a fixed member 23. The wire portion 3 which is inserted into the tube member 11 is formed by a shape memory alloy wire portion 5 and a wire 7. One end of the tube member 11 and one end 5a of the shape memory alloy wire portion 5 are fixed to the fixed member 23. Moreover, in the first embodiment, the bias spring 15 is included in a cylinder 20 linked to the other end of the tube member 11.

The shape memory alloy wire portion 5 is connected to one end 7a of the wire 7 via a joint portion 9, and a length of the shape memory alloy wire portion 5 changes due to contraction by heating by applying current and elongation by cooling. Moreover, the shape memory alloy wire portion 5 is disposed to be included in the tube member 11. The other end 7b of the wire 7 is connected to the movable body 13. With the contraction of the shape memory alloy wire portion 5 by heating by applying current, the movable body 13 which is connected to the wire 7 moves in a direction in which the length of the shape memory alloy wire portion 5 changes.

Furthermore, the bias spring 15 is disposed to make a contact with the movable body 13. The bias spring 15 generates a force in a direction in which the shape memory alloy wire portion 5 elongates (leftward direction in FIG. 1), and functions to aid the elongation of the shape memory alloy wire portion 5 at the time of cooling. By adapting such structure, since the shape memory alloy wire portion 5 is not exposed to an outside of the shape memory alloy actuator 1, it is possible to improve further a temperature controllability of the shape memory alloy wire portion 5, as well as to reduce electric power consumption as no heat is escaped out.

Moreover, since the shape memory alloy wire portion 5 which is a source of heat generation is structured to be set apart from the movable body 13, an arrangement is such that the heat generated from the shape memory alloy wire portion 5 is not transmitted to the movable body 13. Moreover, by covering the shape memory alloy wire portion 5 and the wire 7 by the tube member 11, the heat is further prevented from being transmitted to the outside. Furthermore, by using the wire 7 as a lead tracks for heating the shape memory alloy wire portion 5 by applying current, it is not necessary to provide a wire for applying current to the shape memory alloy wire portion 5, and the structure of the shape memory alloy actuator 1 becomes simple.

Second Embodiment

Figure 2:
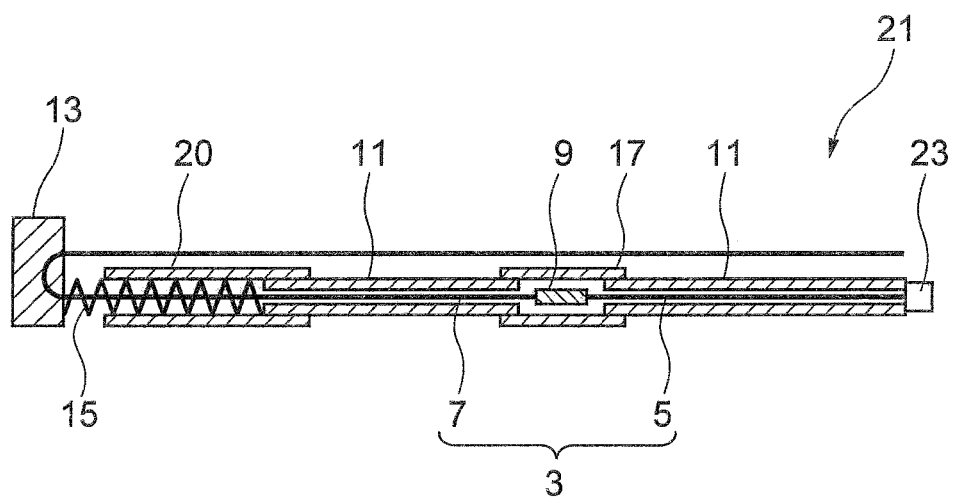
FIG. 2 is a cross-sectional view of a shape memory alloy actuator according to a second embodiment of the present invention.

FIG. 2 is a cross-sectional view of a shape memory alloy actuator 21 according to a second embodiment of the present invention. Unlike in the shape memory alloy actuator 1 according to the first embodiment, the tube member 11 which covers the wire 7 and the shape memory alloy wire portion 5 is linked by a rigid portion or in other words, a pipe member 17 having an inner diameter larger than an outer diameter of the tube member 11, near the joint portion 9.

The pipe member 17 is made of a pipe such as a metallic pipe, and the tube member 11 is bendable (flexible), but the pipe member 17 cannot bend (has a hardness). Furthermore, the pipe member 17 protects the joint portion 9 and also has a function as a guide of the joint portion 9, and further smooth movement of the movable body 13 becomes possible.

Third Embodiment

Figure 3:
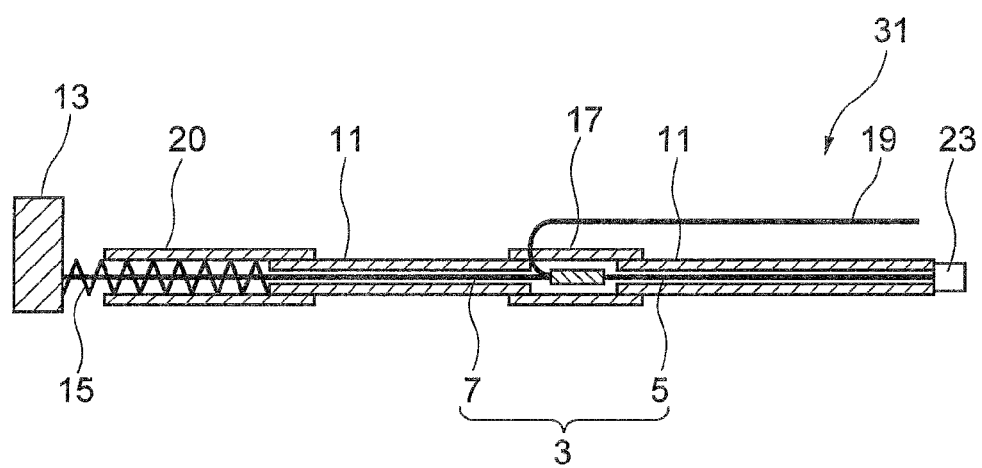
FIG. 3 is a cross-sectional view of a shape memory alloy actuator according to a third embodiment of the present invention.

FIG. 3 is a cross-sectional view of a shape memory alloy actuator 31 according to a third embodiment of the present invention. In the third embodiment, a lead tracks 19 for heating the shape memory alloy wire portion 5 by applying current is supplied from the joint portion 9. Consequently, it is not necessary to draw a wire from the wire 7, and as a wire for constraining the movable body 13 becomes unnecessary, a structure around the movable body 13 is simplified, and it is possible to operate the movable body 13 even more smoothly.

Moreover, since it is not necessary to make the wire 7 to be a lead tracks, it is possible to use a wire which is insulating, or to apply an insulating coating to the wire 7. For instance, by using a wire of Teflon (registered trademark) or applying a coating to the wire, since it is possible to reduce friction between the wire 7 and the tube member 11, it is possible to move the movable body 13 even more smoothly.

Moreover, by imparting an insulating property to the wire 7, it is also possible to let a material of the tube member 11 which covers the wire 7, to be a metallic material. By letting the material to be a metallic material, it is possible to further reduce the friction.

Modified Embodiment of Third Embodiment

Figure 4:
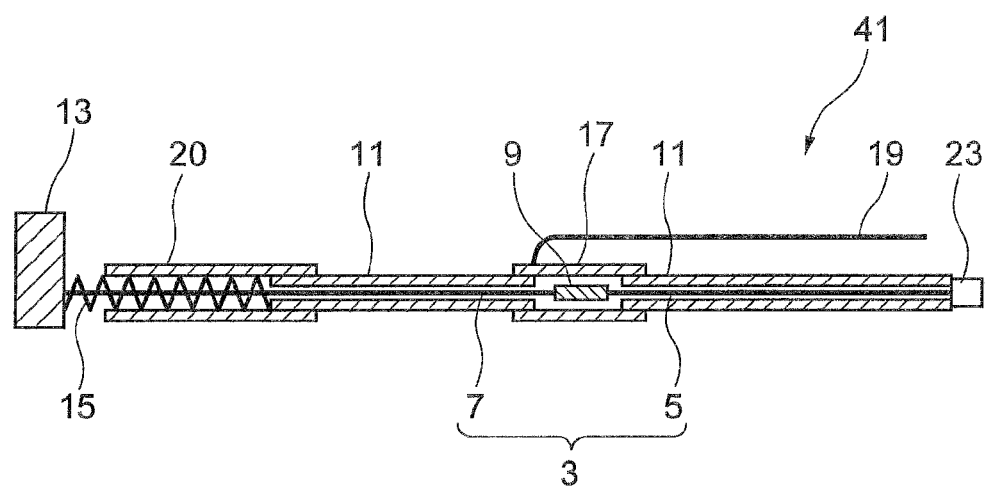
FIG. 4 is a cross-sectional view of a shape memory alloy actuator according to a modified embodiment of the third embodiment.

FIG. 4 is a cross-sectional view of a shape memory alloy actuator 41 which is a modified embodiment of the third embodiment. In the modified embodiment of the third embodiment, the lead tracks 19 for heating the shape memory alloy wire portion 5 by applying current is wired from the pipe member 17. Conduction from the joint portion 9 to the pipe member 17 can be secured by using a wire such as a thin and soft wire which does not have an effect on sliding of the joint portion 9, and a wire which is strong against bending can be used for the wire from the pipe member 17.

Moreover, by wiring from the pipe member 17, assembling of the shape memory alloy actuator 41 becomes simple. The joint portion 9 and the pipe member 17 may be brought into conduction by disposing a brush to the joint portion 9.

Fourth Embodiment

Figure 5:
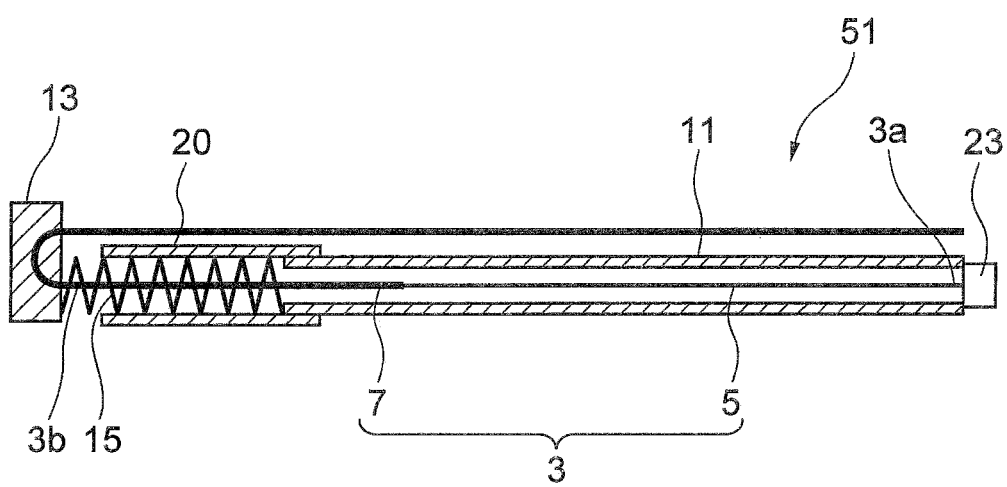
FIG. 5 is a cross-sectional view of a shape memory alloy actuator according to a fourth embodiment of the present invention.

FIG. 5 is a cross-sectional view of a shape memory alloy actuator 51 according to a fourth embodiment of the present invention. A fixed member 23 is connected to one end 3a of the wire portion 3 which is formed by the shape memory alloy wire, and the movable body 13 is connected to the other end 3b of the wire portion 3. In the fourth embodiment, the wire portion 3 has a wire 7 which has a site having a metallic coating, near the movable body 13. The wire 7 being coated with a metallic material having a low resistance, the resistance of wire becomes small. The shape memory alloy wire portion 5 which is a site of the wire portion 3 which is not coated, being a high-resistance body, generates heat upon applying current, and contracts, and since the resistance of wire 7 becomes small, the wire 7 does not generate heat.

Even in the fourth embodiment, the shape memory alloy wire portion 5 which is a heat generating portion, being included in the tube member 11, the temperature controllability of the shape memory alloy wire portion 5 is improved further, and also the heat does not escape to the outside, thereby making it possible to have reduction in power consumption. In a case of the fourth embodiment, the joint portion 9 in the embodiments from the first embodiment to the third embodiment, and the modified embodiment of the third embodiment being unnecessary, the assembling becomes simple.

Moreover, since the structure is such that the movable body 13 and the heat source are set apart thermally, the heat is not transmitted to the movable body 13. Furthermore, by providing metallic coating not only to an area near the movable body 13 but also to a site of the wire 3 which is not covered by the tube member 11, it is possible to use as a lead tracks at the time of heating by applying current.

Items related to the structure and function which are not described in the embodiments from the second embodiment to the fourth embodiment and the modified embodiment of the third embodiment are same as the structure and function in the first embodiment.

Figure 6A:
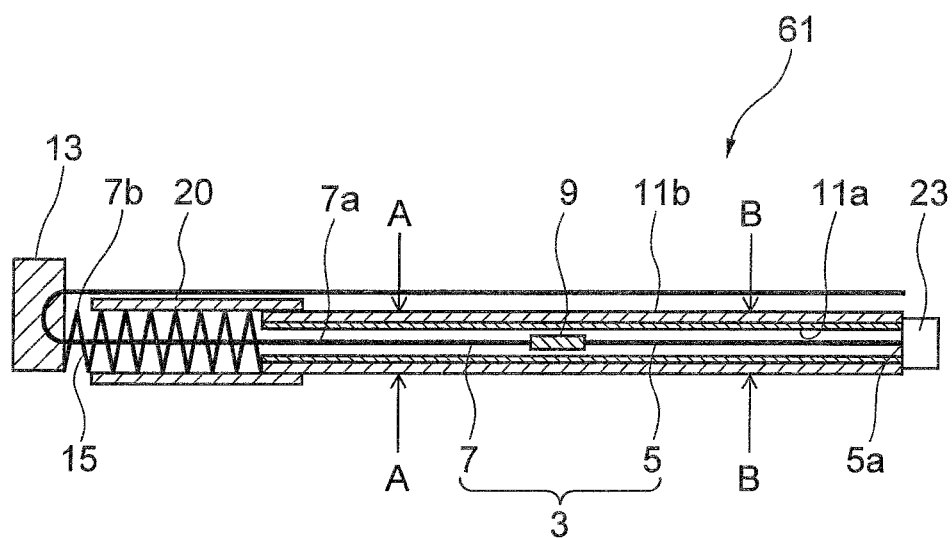
FIG. 6A is a diagram of a modified embodiment showing a cross-sectional view of the shape memory alloy actuator according to the first embodiment of the present invention.
Figure 6B:
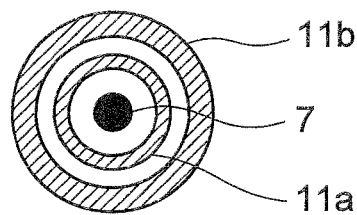
FIG. 6B and FIG. 6C are cross-sectional views of FIG. 6A.
Figure 6C:
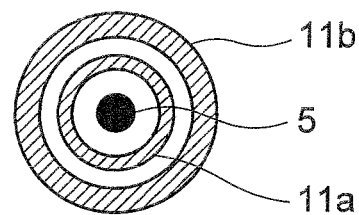
Figure 7:
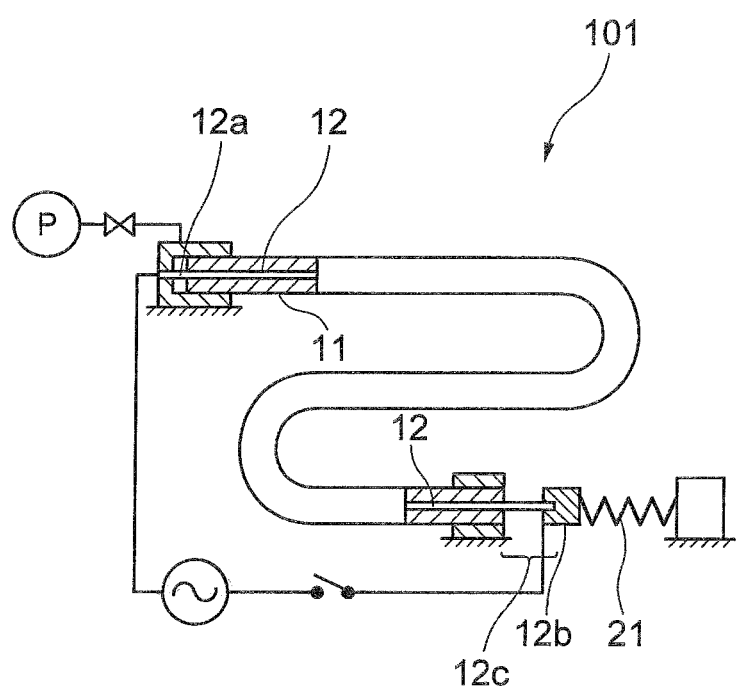
FIG. 7 is partial cross-sectional front view of a conventional shape memory alloy actuator.

FIG. 6A is a diagram showing a cross-sectional view of a shape memory alloy actuator 61 which is a modified embodiment of the shape memory alloy actuator in FIG. 1. Moreover, FIG. 6B and FIG. 6C are diagrams showing cross-sectional views along a line A-A and a line B-B in FIG. 6A. In this modified embodiment, the tube member 11 is formed by two tube members namely, a tube member 11a and a tube member 11b, and has a wire member and a shape memory alloy wire inserted therein.

The tube member 11 is sought to have an appropriate flexibility and favorable slidability on an inner-wall surface (improvement in a speed of movement of the actuator). Therefore, the tube member 11 having a double-pipe structure may be formed by using the abovementioned two tube members 11a and 11b. The wire member and the tube member 11a which makes a contact with the shape memory alloy wire are sought to have slidability. Therefore, a Teflon (registered trademark) material such as PTFE which is a member with a small coefficient of friction is to be used typically. The tube member 11b which covers the tube member 11a is sought to have an appropriate flexibility and strength of a degree such that it is not buckled. Therefore, by using typically a material having a high strength such as PEEK, the tube member 11a is to be reinforced. According to such arrangement, it is possible to improve the slidability and to retain flexibility and strength.

Although the abovementioned arrangement of the modified embodiment has been described as the modified embodiment of the first embodiment, such an arrangement is common to all the other abovementioned embodiments.

REFERENCE SIGNS LIST 1 shape memory alloy actuator
3 wire portion
5 shape memory alloy wire portion
7 wire (non-deformable portion)
9 joint portion
11, 11a, 11b tube member
13 movable body
15 bias spring
17 pipe member
19 lead tracks
20 cylinder
23 fixed member

What is claimed is:
1. A shape memory alloy actuator comprising:
a shape memory alloy wire portion of which a length changes due to contraction by heating by applying current, and due to elongation by cooling;
a non-deformable portion which is formed at an other end of the shape memory alloy wire portion, and of which a length does not change;
a wire portion which is formed by the shape memory alloy wire portion and the non-deformable portion;
a tube member in which the wire portion is inserted into;
a movable body which is movable in a direction in which the length of the shape memory alloy wire portion changes;
an elastic member which exerts an external force in the direction in which the shape memory alloy wire portion elongates; and a fixed member to which one end of the tube member and one end of the shape memory alloy wire portion are fixed, wherein one end of the non-deformable portion which forms the wire portion is connected to the movable body, and the tube member includes therein the shape memory alloy wire portion, and includes therein at least a part of the non-deformable portion.

2. The shape memory alloy actuator according to claim 1, wherein the non-deformable portion is a wire of which one end is to be connected to the shape memory alloy wire portion, and the other end is to be fixed to the movable body.

3. The shape memory alloy actuator according to claim 2, wherein the tube member has a rigid portion which is near a joint portion of the shape memory alloy wire portion and the wire.

4. The shape memory alloy actuator according to claim 3, wherein the joint portion of the shape memory alloy wire portion and the wire is inserted into a pipe member having an inner diameter larger than an outer diameter of the tube member.

5. The shape memory alloy actuator according to claim 4, wherein the wire also serves as a lead tracks for applying current to the shape memory alloy wire portion.

6. The shape memory alloy actuator according to claim 5, wherein the lead tracks for applying current to the shape memory alloy wire portion is connected to the joint portion.

7. The shape memory alloy actuator according to claim 6, wherein the wire has a structure having an insulating coating formed thereon, or, the wire is an insulating material.

8. The shape memory alloy actuator according to claim 7, wherein the tube member which includes at least a part of the wire is made of a metallic material.

9. The shape memory alloy actuator according to claim 1, wherein the tube member has a rigid portion near a joint portion of the shape memory alloy wire portion and the wire.

10. The shape memory alloy actuator according to claim 1, wherein the non-deformable portion is a site at which the shape memory alloy wire portion has a metallic coating.

11. The shape memory alloy actuator according to claim 1, wherein a site which is coated, also serves as a lead tracks for applying current to the shape memory alloy wire portion.

12. The shape memory alloy actuator according to claim 2, wherein a joint portion of the shape memory alloy wire portion and the wire is inserted into a pipe member having an inner diameter larger than an outer diameter of the tube member.

13. The shape memory alloy actuator according to claim 2, wherein the wire also serves as a lead tracks for applying current to the shape memory alloy wire portion.

14. The shape memory alloy actuator according to claim 2, wherein a lead tracks for applying current to the shape memory alloy wire portion has an inner diameter larger than an outer diameter of the tube member.

* * * * *